United States Patent
Lee

(10) Patent No.: US 11,872,488 B2
(45) Date of Patent: Jan. 16, 2024

(54) METHOD AND SYSTEM FOR PROVIDING GAME USING SWITCHING BETWEEN CONTINUOUS AND AUTOMATIC BATTLE AND MANUAL BATTLE

(71) Applicant: COM2US CORPORATION, Geumcheon-gu Seoul (KR)

(72) Inventor: Joohwan Lee, Geumcheon-gu Seoul (KR)

(73) Assignee: COM2US CORPORATION, Seoul (KR)

( * ) Notice: Subject to any disclaimer, the term of this patent is extended or adjusted under 35 U.S.C. 154(b) by 200 days.

(21) Appl. No.: 17/467,917

(22) Filed: Sep. 7, 2021

(65) Prior Publication Data
US 2022/0072424 A1 Mar. 10, 2022

(30) Foreign Application Priority Data

Sep. 8, 2020 (KR) .................. 10-2020-0114520
Dec. 18, 2020 (KR) .................. 10-2020-0178762

(51) Int. Cl.
*A63F 13/533* (2014.01)
*A63F 13/537* (2014.01)
*A63F 13/56* (2014.01)

(52) U.S. Cl.
CPC .......... *A63F 13/533* (2014.09); *A63F 13/537* (2014.09); *A63F 13/56* (2014.09); *A63F 2300/303* (2013.01); *A63F 2300/308* (2013.01); *A63F 2300/6607* (2013.01)

(58) Field of Classification Search
CPC ........ A63F 13/55; A63F 13/56; A63F 13/533; A63F 13/538; A63F 2300/303; A63F 2300/308; A63F 2300/6607; A63F 2300/8076
See application file for complete search history.

(56) References Cited

U.S. PATENT DOCUMENTS

| | | | |
|---|---|---|---|
| 6,758,756 B1 * | 7/2004 | Horigami | A63F 13/54 463/31 |
| 7,559,834 B1 * | 7/2009 | York | A63F 13/10 463/2 |
| 7,594,847 B1 * | 9/2009 | York | A63F 13/48 463/2 |
| 7,843,453 B2 * | 11/2010 | Nakagawa | G09B 9/05 463/6 |

(Continued)

FOREIGN PATENT DOCUMENTS

KR 1020110105485 9/2011

*Primary Examiner* — David L Lewis
*Assistant Examiner* — Matthew D Hoel
(74) *Attorney, Agent, or Firm* — CHRISTENSEN O'CONNOR JOHNSON KINDNESS PLLC

(57) ABSTRACT

Disclosed are a method and system for providing game using switching between a continuous and automatic battle and a manual battle. The method of providing game may include generating a continuous and automatic battle screen related to the progress of a continuous and automatic battle when a continuous and automatic battle function is activated, displaying the continuous and automatic battle screen, and changing the continuous and automatic battle screen into a manual battle screen in response to an input from a user, which is associated with the continuous and automatic battle screen.

13 Claims, 11 Drawing Sheets

(56) References Cited

U.S. PATENT DOCUMENTS

| | | | | |
|---|---|---|---|---|
| 8,012,016 B2 * | 9/2011 | York | A63F 13/42 | 463/31 |
| 8,012,017 B2 * | 9/2011 | York | A63F 13/00 | 463/31 |
| 8,017,857 B2 * | 9/2011 | Chiu | A63F 13/24 | 84/723 |
| 8,025,566 B2 * | 9/2011 | Walker | G06Q 10/063 | 463/16 |
| 8,292,736 B2 * | 10/2012 | Kato | A63F 13/20 | 463/31 |
| 8,439,733 B2 * | 5/2013 | Kay | G10H 1/368 | 463/7 |
| 8,444,464 B2 * | 5/2013 | Boch | A63F 13/46 | 463/7 |
| 8,449,360 B2 * | 5/2013 | Stoddard | A63F 13/215 | 463/7 |
| 8,465,366 B2 * | 6/2013 | Applewhite | A63F 13/215 | 463/43 |
| 8,469,819 B2 * | 6/2013 | McMain | A63F 13/537 | 463/23 |
| 8,550,908 B2 * | 10/2013 | Booth | A63F 13/5375 | 463/31 |
| 8,663,013 B2 * | 3/2014 | Egozy | A63F 13/12 | 463/43 |
| 8,678,896 B2 * | 3/2014 | Pitsch | A63F 13/12 | 463/7 |
| 8,686,269 B2 * | 4/2014 | Schmidt | G10H 1/342 | 84/478 |
| 8,686,950 B2 * | 4/2014 | Yamamoto | G06F 9/451 | 345/173 |
| 8,702,485 B2 * | 4/2014 | Flury | A63F 13/46 | 463/7 |
| 8,892,219 B2 * | 11/2014 | Pryor | B60K 35/00 | 482/901 |
| 8,989,521 B1 * | 3/2015 | Ho | G06V 20/40 | 725/38 |
| 9,024,166 B2 * | 5/2015 | Ramos | G11B 20/10527 | 84/610 |
| 9,180,365 B2 * | 11/2015 | Torre | A63F 13/285 | |
| 9,358,456 B1 * | 6/2016 | Challinor | A63F 13/44 | |
| 9,421,459 B2 * | 8/2016 | Ikeda | A63F 13/577 | |
| 9,566,522 B2 * | 2/2017 | Holm | A63F 13/45 | |
| 9,586,134 B2 * | 3/2017 | Tsukioka | A63F 13/35 | |
| 9,704,350 B1 * | 7/2017 | Rigopulos | G07F 17/326 | |
| 9,878,244 B2 * | 1/2018 | Yamagami | A63F 13/52 | |
| 9,981,193 B2 * | 5/2018 | Adams | A63F 13/213 | |
| 10,029,180 B2 * | 7/2018 | Yamagami | A63F 13/56 | |
| 10,105,600 B2 * | 10/2018 | Yasuda | A63F 13/25 | |
| 10,252,161 B2 * | 4/2019 | Tsukioka | A63F 13/00 | |
| 10,357,714 B2 * | 7/2019 | Challinor | G06F 3/0482 | |
| 10,576,377 B2 * | 3/2020 | Taura | A63F 13/5372 | |
| 10,600,245 B1 * | 3/2020 | Latta | H04N 21/44029 | |
| 10,602,200 B2 * | 3/2020 | Grant | G06F 16/9577 | |
| 11,173,406 B2 * | 11/2021 | Ryu | A63F 13/822 | |
| 11,344,811 B2 * | 5/2022 | Asano | A63F 13/35 | |
| 11,351,457 B2 * | 6/2022 | Huang | A63F 13/5372 | |
| 11,367,328 B2 * | 6/2022 | Kotani | G07F 17/3251 | |
| 11,389,724 B2 * | 7/2022 | Takafuji | A63F 13/46 | |
| 11,400,374 B2 * | 8/2022 | Chen | A63F 13/837 | |
| 11,508,125 B1 * | 11/2022 | Latta | G06T 19/003 | |
| 2008/0094390 A1 * | 4/2008 | Nakagawa | A63F 13/803 | 345/419 |
| 2011/0039619 A1 * | 2/2011 | Kojima | A63F 13/5258 | 463/31 |
| 2011/0304620 A1 * | 12/2011 | Yamada | G06T 15/04 | 345/420 |
| 2012/0302352 A1 * | 11/2012 | Ajami | A63F 13/58 | 463/42 |
| 2012/0309529 A1 * | 12/2012 | Westlund | H04N 13/122 | 463/33 |
| 2013/0169668 A1 * | 7/2013 | Lynch | G01S 7/4808 | 345/619 |
| 2014/0243079 A1 * | 8/2014 | Tsukioka | A63F 13/525 | 463/29 |
| 2014/0243089 A1 * | 8/2014 | Tsukioka | A63F 13/35 | 463/31 |
| 2015/0157932 A1 * | 6/2015 | Kwon | G06F 3/0488 | 463/31 |
| 2015/0234683 A1 * | 8/2015 | Ogasawara | G06F 9/3009 | 711/163 |
| 2017/0128833 A1 * | 5/2017 | Tsukioka | A63F 13/822 | |
| 2017/0151502 A1 * | 6/2017 | Yasuda | A63F 13/335 | |
| 2018/0001189 A1 * | 1/2018 | Tang | G06F 3/04842 | |
| 2021/0146248 A1 * | 5/2021 | Chen | A63F 13/837 | |
| 2022/0072423 A1 * | 3/2022 | Lee | A63F 13/537 | |
| 2022/0072424 A1 * | 3/2022 | Lee | A63F 13/422 | |
| 2022/0126205 A1 * | 4/2022 | Wan | A63F 13/56 | |
| 2022/0161138 A1 * | 5/2022 | Liang | A63F 13/837 | |
| 2022/0266136 A1 * | 8/2022 | Yang | A63F 13/537 | |
| 2023/0065576 A1 * | 3/2023 | Liu | A63F 13/58 | |

* cited by examiner

METHOD AND SYSTEM FOR PROVIDING GAME USING SWITCHING BETWEEN CONTINUOUS AND AUTOMATIC BATTLE AND MANUAL BATTLE

CROSS-REFERENCES TO RELATED APPLICATIONS

This application is based on and claims priority under 35 U.S.C. 119 to Korean Patent Application No. 10-2020-0114520, filed on Sep. 8, 2020, and Korean Patent Application No. 10-2020-0178762, filed on Dec. 18, 2020, in the Korean intellectual property office, the disclosures of which are herein incorporated by reference in their entireties.

TECHNICAL FIELD

The following description relates to a method and system for providing game using switching between a continuous and automatic battle and a manual battle.

BACKGROUND OF THE INVENTION

There are pieces of game which provide a continuous and automatic battle function for user convenience. The continuous and automatic battle function may mean a function capable of automatically and repeatedly clearing in any one selected game stage of multiple game stages multiple times.

For example, a game environment may be taken into consideration in which a game stage is cleared when a user achieves a preset mission according to the game stage by fighting battles with multiple non-player characters (NPCs) disposed in the game stage while controlling the use of a skill of its own character (or a combination of characters), a movement of the character and/or a behavior of the character. In this case, a continuous and automatic battle function provides a function for enabling a system to repeatedly clear a corresponding game stage by preset times by automatically controlling the use of a skill of a character (or a combination of characters) of a user, a movement of the character and/or a behavior of the character so that the system can clear the corresponding game stage without control of the user.

Accordingly, a user can obtain a gain, such as the growth of a character(s) or the acquisition of an item according to the clearance of a game stage, while reducing the time taken for game by using the continuous and automatic battle function.

However, such a continuous and automatic battle function has a problem in that a user cannot access other pieces of content in game until a continuous and automatic battle is completed or until the continuous and automatic battle function is deactivated. For example, it is difficult for a user to check items sold through a store function or to check characters not participating in a continuous and automatic battle, while the continuous and automatic battle is ongoing and to participate in a continuous and automatic battle that is ongoing.

PRIOR ART DOCUMENT

Korean Patent Application Publication No. 10-2011-0105485

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a method and system for providing game, which enable a user to access other pieces of content in game while a continuous and automatic battle is ongoing by executing a sub-process for the continuous and automatic battle when a continuous and automatic battle function is activated on a main game screen provided by a main process and providing a continuous and automatic battle screen generated by the executed sub-process in parallel to the main game screen provided by the main process.

Embodiments provide a method and system for providing game, which enable a user to change a continuous and automatic battle screen into a manual battle screen and to participate in the ongoing continuous and automatic battle.

In an aspect, a method of providing, by a computing device including at least one processor, game includes generating, by the at least one processor, a continuous and automatic battle screen related to the progress of a continuous and automatic battle when a continuous and automatic battle function is activated, displaying, by the at least one processor, the continuous and automatic battle screen, and changing, by the at least one processor, the continuous and automatic battle screen into a manual battle screen in response to an input from a user, which is associated with the continuous and automatic battle screen.

According to an aspect, the method may further include performing, by the at least one processor, a manual battle in response to an input from the user for a user interface included in the manual battle screen.

According to another aspect, the method may further include transmitting, by the at least one processor, information on the progress of the continuous and automatic battle to a process for the progress of a manual battle so that contents of the continuous and automatic battle is followed by the manual battle when the continuous and automatic battle screen is changed into the manual battle screen.

According to still another aspect, the manual battle screen may include a user interface for activating the continuous and automatic battle screen. The method may further include changing, by the at least one processor, the manual battle screen into the continuous and automatic battle screen again in response to an input from the user for a user interface for activating the continuous and automatic battle screen.

According to still another aspect, the method may further include transmitting, by the at least one processor, information on the progress of a manual battle to a process for the progress of the continuous and automatic battle so that contents of the manual battle are followed by the continuous and automatic battle when the manual battle screen is changed into the continuous and automatic battle screen again.

According to still another aspect, the method may further include providing, by the at least one processor, a main game screen by using a main process. Generating a continuous and automatic battle screen may include executing a sub-process for the continuous and automatic battle when the continuous and automatic battle function is activated, and generating the continuous and automatic battle screen related to the progress of the continuous and automatic battle by using the sub-process.

According to still another aspect, changing the continuous and automatic battle screen into a manual battle screen may include changing, into the manual battle screen for a manual battle performed by the main process, the continuous and automatic battle screen for the continuous and automatic battle performed by the sub-process.

According to still another aspect, the method may further include changing, by the at least one processor, the manual battle screen into the continuous and automatic battle screen again when a manual battle is terminated through the manual battle screen.

According to still another aspect, displaying the continuous and automatic battle screen may include overlapping and displaying the continuous and automatic battle screen on a main game screen in a picture in picture (PIP) form.

According to still another aspect, changing the continuous and automatic battle screen into a manual battle screen may include changing, into the manual battle screen of a full screen, the continuous and automatic battle screen overlapped and displayed on the main game screen.

In an aspect, there is provided a computer-readable recording medium on which a computer program for executing the method in a computing device has been recorded.

In an aspect, a computing device includes at least one processor implemented to execute an instruction readable by a computing device. The at least one processor is implemented to generate a continuous and automatic battle screen related to the progress of a continuous and automatic battle when a continuous and automatic battle function is activated, display the continuous and automatic battle screen, and change the continuous and automatic battle screen into a manual battle screen in response to an input from a user, which is associated with the continuous and automatic battle screen.

A user can access other pieces of content in game while a continuous and automatic battle is ongoing because a sub-process for the continuous and automatic battle is executed when a continuous and automatic battle function is activated on a main game screen provided by a main process and a continuous and automatic battle screen generated by the executed sub-process is provided in parallel to the main game screen provided by the main process.

A user can participate in an ongoing continuous and automatic battle by changing a continuous and automatic battle screen into a manual battle screen.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
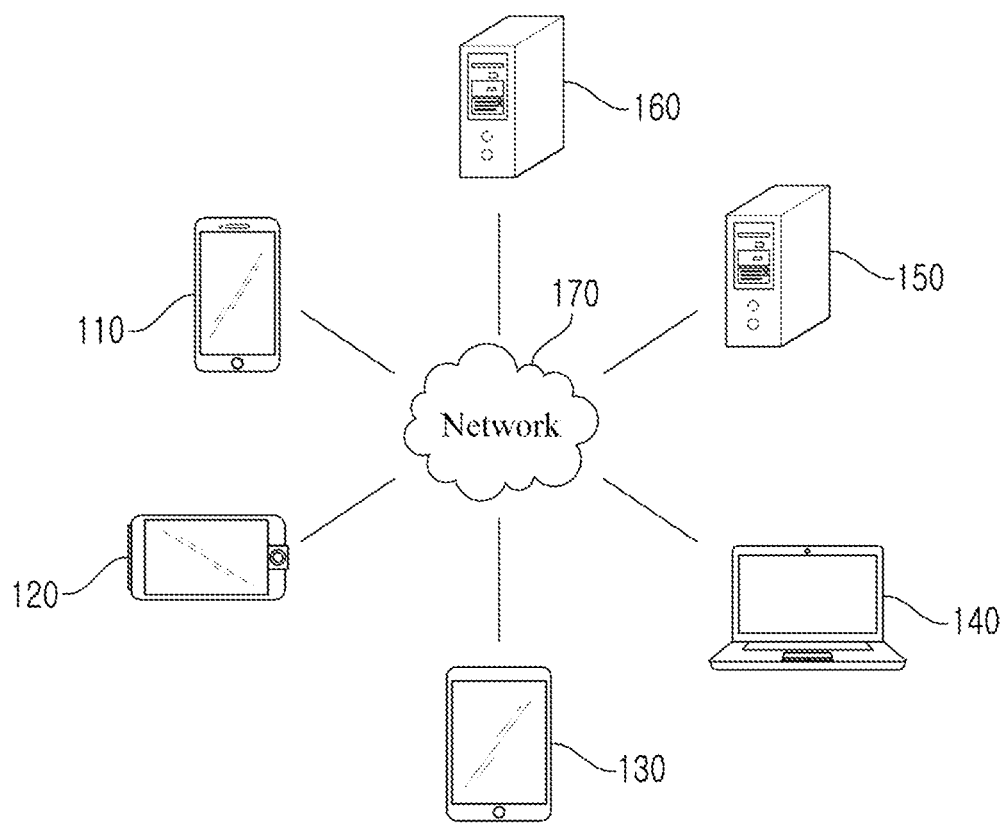
FIG. 1 is a diagram illustrating an example of a network environment according to an embodiment of the present disclosure.

While illustrative embodiments have been illustrated and described, it will be appreciated that various changes can be made therein without departing from the spirit and scope of the invention.

The present disclosure may be changed in various ways and may have various embodiments, and specific embodiments are illustrated in the drawings and described in detail in the detailed description. It is however to be understood that the present disclosure is not intended to be limited to the specific embodiments and includes all changes, equivalents and substitutions which fall within the spirit and technological scope of the present disclosure. In the drawings, similar reference numerals are used for similar components.

Terms, such as a first, a second, A and B, may be used to describe various components, but the components should not be restricted by the terms. The terms are used to only distinguish one component from the other component. For example, a first component may be named a second component without departing from the scope of rights of the present disclosure. Likewise, a second component may be named a first component. The term "and/or" includes a combination of a plurality of related and described items or any one of a plurality of related and described items.

When it is said that one component is "connected" or "coupled" to the other component, it should be understood that one component may be directly connected or coupled" to the other component, but a third component may exist between the two components. In contrast, when it is described that one component is "directly connected" or "directly coupled" to the other component, it should be understood that a third component does not exist between the two components.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate the presence of a characteristic, a number, a step, an operation, a component, a part or a combination of them described in the specification and does not exclude the existence or possible addition of one or more other characteristics, numbers, steps, operations, components, parts or combinations of them in advance.

All terms used herein, including technical terms or scientific terms unless defined otherwise in the specification, have the same meanings as those commonly understood by a person having ordinary knowledge in the art to which the present disclosure pertains. Terms, such as those commonly used and defined in dictionaries, should be construed as having the same meanings as those in the context of a related technology, and are not construed as being ideal or excessively formal unless explicitly defined otherwise in the specification.

Hereinafter, embodiments are described in detail with reference to the accompanying drawings.

A system for providing game according to embodiments of the present disclosure may be implemented by at least one computing device. A method of providing game according to embodiments of the present disclosure may be performed through at least one computing device that implements the system for providing game. A computer program according to an embodiment of the present disclosure may be installed and driven in the computing device. The computing device may perform the method of providing game according to embodiments of the present disclosure under the control of the driven computer program. The computer program may be stored in a computer-readable recording medium combined with the computing device in order to execute the method of providing game in the computing device.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 with services (e.g., a game provision service, a content provision service, an archiving service, a file distribution service, a map service, a group communication service (or a voice conference service), a messaging service, a mail service, a social network service, a translation service, a finance service, a payment service, and a search service) over the network 170.

Figure 2:
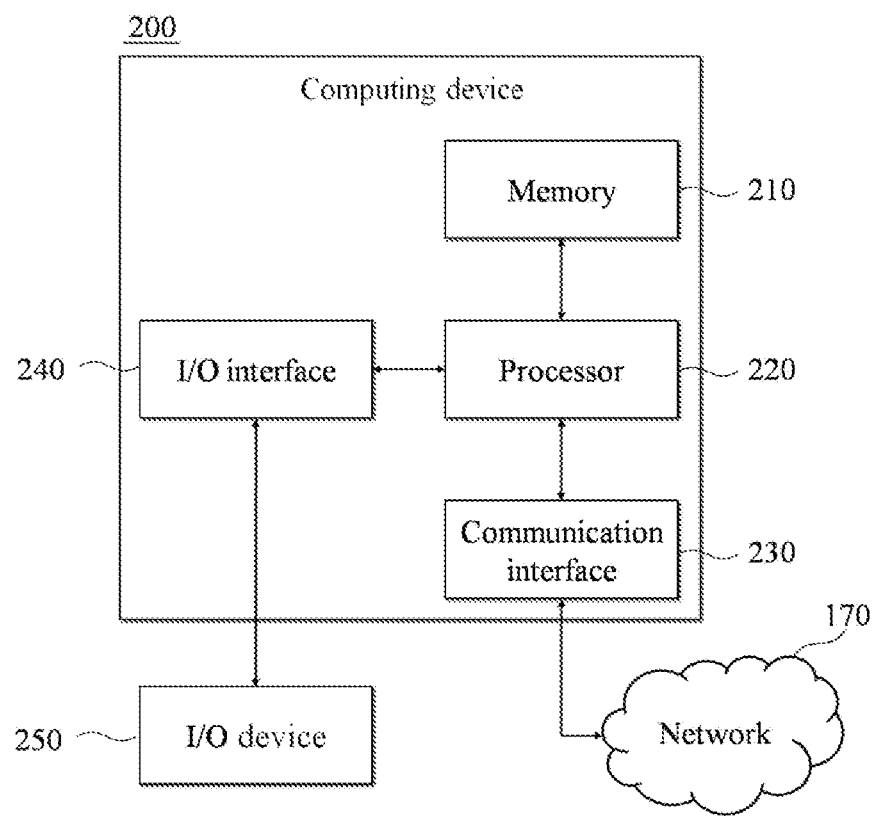
FIG. 2 is a block diagram illustrating an example of a computing device according to an embodiment of the present disclosure.

FIG. 2 is a block diagram illustrating an example of a computing device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable medium, separated from the memory 210, to the memory 210. Such a separate computer-readable medium may include computer-readable recording media, such as a floppy drive, a disk, a tape, a DVD/CD-ROM drive, and a memory card. In another embodiment, software components may be loaded onto the memory 210 through the communication interface 230 not a computer-readable medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. For another example, the I/O interface 240 may be means for an interface with a device in which functions for input and output have been integrated into one, such as a touch screen. At least one of the I/O devices 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
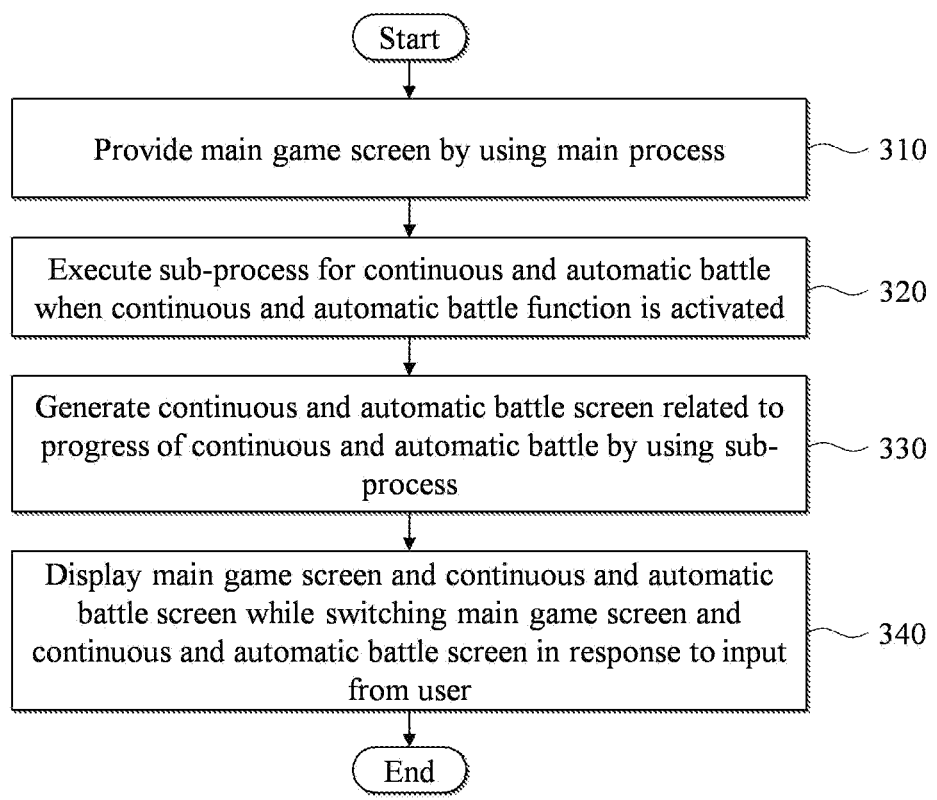
FIG. 3 is a flowchart illustrating an example of a method of providing game in an embodiment of the present disclosure.

FIG. 3 is a flowchart illustrating an example of a method of providing game in an embodiment of the present disclosure. The method of providing game according to the present embodiment may be performed by the computing device 200 which implements the system for providing game. In this case, the processor 220 of the computing device 200 may be implemented to execute a control instruction according to a code of an operating system or a code of at least one computer program (e.g., a game application) included in the memory 210. In this case, the processor 220 may control the computing device 200 to perform steps 310 to 340 included in the method of FIG. 3 in response to a control instruction provided by a code stored in the computing device 200.

In step 310, the computing device 200 may provide a main game screen by using a main process. The main game screen may mean various screens related to the progress of a game service. For example, the game service may include various types of game content. A screen for game content selected and performed by a user may also be included in the main game screen. In this case, the various screens may include various user interfaces (UIs) respective screens.

One of such UIs may include a UI in which a user can activate a continuous and automatic battle function.

In step 320, when a continuous and automatic battle function is activated, the computing device 200 may execute a sub-process for a continuous and automatic battle. For example, as described above, there may be provided a UI in which a user can activate the continuous and automatic battle function through the main game screen. When the user activates the continuous and automatic battle function, the computing device 200 may execute the sub-process.

In step 330, the computing device 200 may generate a continuous and automatic battle screen related to the progress of the continuous and automatic battle by using a sub-process. In other words, the main process and the sub-process may provide the main game screen and the continuous and automatic battle screen in parallel.

In step 340, the computing device 200 may display the main game screen and the continuous and automatic battle screen while switching the main game screen and the continuous and automatic battle screen in response to an input from the user. In an embodiment, in step 340, the computing device 200 may overlap and display a second layer for the continuous and automatic battle screen on a first layer for the main game screen, and may switch the main game screen and the continuous and automatic battle screen by changing the locations of the first layer and the second layer in response to an input from the user. In other words, the user may selectively confirm a desired screen among the main game screen and the continuous and automatic battle screen, and can be provided with another piece of game content different from the continuous and automatic battle through the main game screen while the continuous and automatic battle is ongoing.

Figure 4:
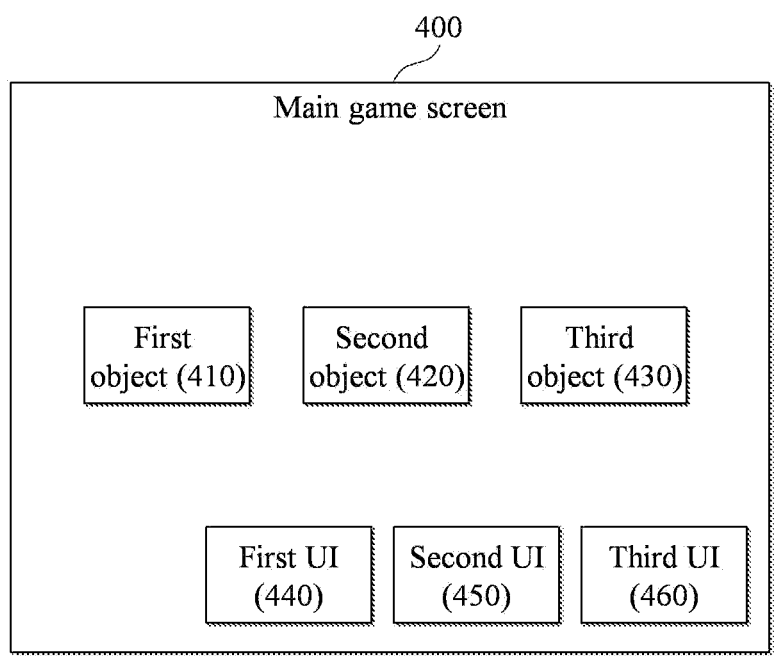
FIGS. 4 to 6 are diagrams illustrating examples in which a main game screen and a continuous and automatic battle screen are switched in an embodiment of the present disclosure.
Figure 5:
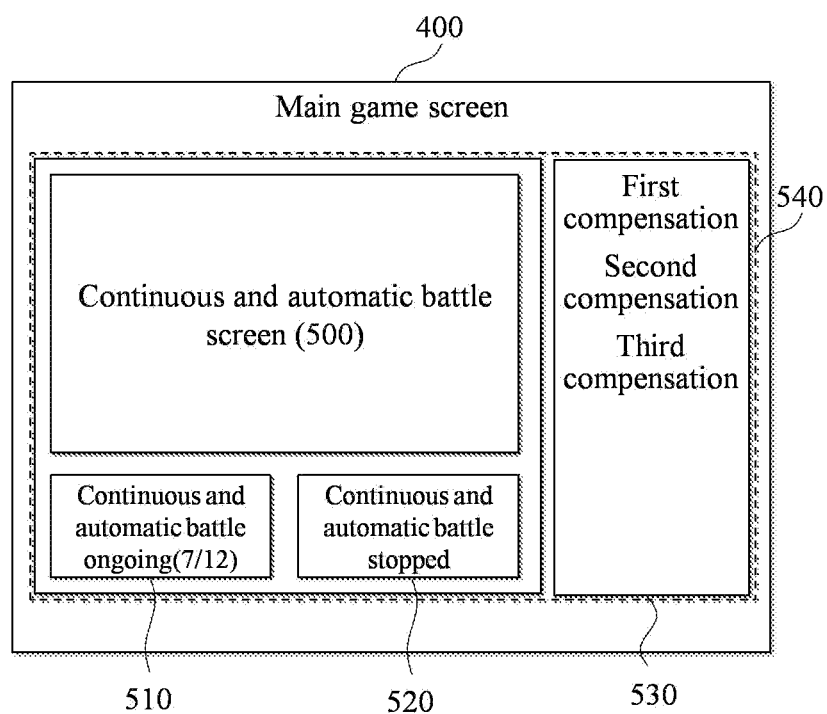
Figure 6:
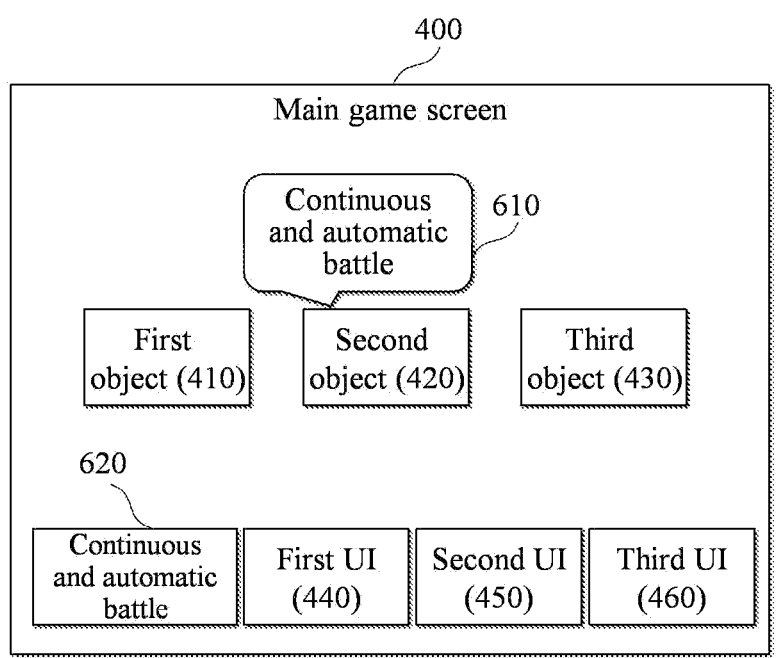

FIGS. 4 to 6 are diagrams illustrating examples in which a main game screen and a continuous and automatic battle screen are switched in an embodiment of the present disclosure.

Various objects related to a game service and various user interfaces (UIs) related to the game service may be displayed on a main game screen 400. FIG. 4 illustrates three objects (e.g., a first object 410, a second object 420 and a third object 430) and three UIs (e.g., a first UI 440, a second UI 450 and a third UI 460) by simplifying the various objects and the various UIs. This may be easily understood that the three objects and the three UIs are simplified objects and the UIs in order to help understanding of the present disclosure.

For example, when a user selects the second object 420, a battle for any one of multiple dungeons provided by the game service may be performed. In this case, it is assumed that a continuous and automatic battle function for the corresponding dungeon may be activated. At this time, when the continuous and automatic battle function is activated, the computing device 200 may generate and display a continuous and automatic battle screen 500 on the main game screen 400 as in FIG. 5 by using a sub-process. In this case, a UI 510 indicating that the continuous and automatic battle is ongoing, a UI 520 for stopping the continuous and automatic battle, a UI 530 for displaying compensation obtained as the continuous and automatic battle is performed in real time, etc. may be provided in association with the continuous and automatic battle screen 500.

In this case, the user may be provided with a function for switching the main game screen 400 and the continuous and automatic battle screen 500. Such a function may be provided in various ways. For example, in FIG. 5, a part of the main game screen 400 may be displayed outside a dotted box 540. When the user selects the part of the main game screen 400 (e.g., touches a corresponding region in a touch screen environment or clicks on a corresponding region in a PC environment by using a mouse), in response to such an input from the user, the continuous and automatic battle screen 500 of FIG. 5 may be changed into a background and simultaneously the main game screen 400 may be activated again and displayed as in FIG. 6.

When the main game screen 400 is activated again, the computing device 200 may display information 610, indicating that the continuous and automatic battle is ongoing, in association with an object (e.g., the second object 420 in the embodiment of FIG. 6) associated with the continuous and automatic battle on the main game screen 400 as in FIG. 6. At this time, when a selection input for the object associated with the continuous and automatic battle is recognized, the computing device 200 may change, into the continuous and automatic battle screen 500 again, the main game screen 400 that is being activated and displayed. At this time, as in FIG. 5, the UIs 510, 520 and 530 associated with the continuous and automatic battle screen 500 may also be activated. FIG. 6 illustrates the information 610, indicating that the continuous and automatic battle is ongoing, in the form of text, but may illustrate that the continuous and automatic battle is ongoing in another form, such as an image. Furthermore, FIG. 6 illustrates an example in which the information 610 is displayed in association with an object associated with a continuous and automatic battle, but the present disclosure is not limited thereto. For example, the information 610 may be disposed at any location where the ongoing state of a continuous and automatic battle is displayed on the main game screen 400, where the user of other content is not hindered.

Furthermore, when the main game screen 400 is activated again, the computing device 200 may add, on the main game screen 400, a UE 620 for changing, into the continuous and automatic battle screen 500, the main game screen 400 that is being activated and displayed. For example, when the user selects the UI 620 (e.g., touches a corresponding region in a touch screen environment or clicks on a corresponding region in a PC environment by using a mouse), in response to such an input from the user, the main game screen 400 of FIG. 6 may be changed into a background, and simultaneously the continuous and automatic battle screen 500 may be activated again and displayed as in FIG. 5.

The computing device 200 may recognize an input from the user as an input associated with an activated screen, among the main game screen 400 and the continuous and automatic battle screen 500. For example, as in FIGS. 4 and 6, when the main game screen 400 is activated, the computing device 200 may provide various types of content through the main game screen 400 even in a situation in which the continuous and automatic battle is ongoing by recognizing an input from the user as an input associated with the main game screen 400. Inversely, when the continuous and automatic battle screen 500 is activated as in FIG. 5, the computing device 200 may recognize an input from the user, which is related to the continuous and automatic battle, by recognizing the user input as an input associated with the continuous and automatic battle screen 500.

Figure 7:
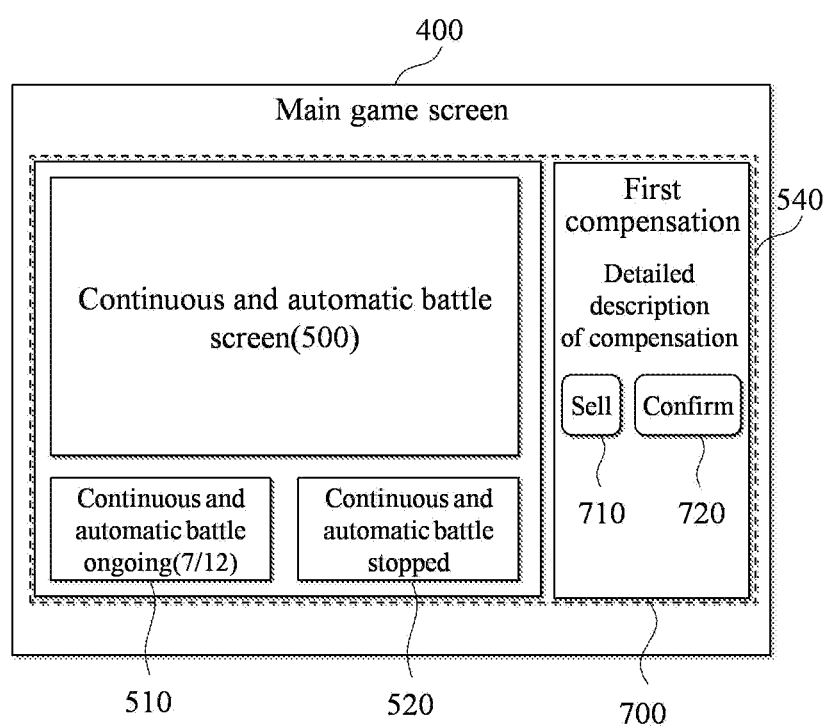
FIG. 7 is a diagram illustrating an example of a user interface for the selling of compensation in an embodiment of the present disclosure.

FIG. 7 is a diagram illustrating an example of a UI for the selling of compensation in an embodiment of the present disclosure. In relation to FIG. 5, the UI 530 for displaying compensation obtained as the continuous and automatic battle is performed in real time has been described. At this time, when the user selects a specific compensation (e.g., first compensation in the present embodiment) (e.g., touches a corresponding region in a touch screen environment or clicks on a corresponding region in a PC environment by using a mouse), a function 700 for providing a detailed description of the selected compensation may be provided as in FIG. 7. In this case, the function 700 may provide a UI 710 for the selling of the selected compensation. In other words, the computing device 200 may provide the UI for the selling of the compensation being displayed, in association with the continuous and automatic battle screen. Each of pieces of compensation may be matched with a specific value of cryptocurrency for each game service, for example. When the selected compensation is sold, the specific value of cryptocurrency matched with the selected compensation may be provided to the user. When the UI "Confirm" 720 is selected, the function 700 may be changed into the UI 530 in FIG. 5 again. Compensation obtained as the continuous and automatic battle is performed may be displayed in real time. If selected compensation has been sold, the display of the selected compensation may be removed from the UI 530.

Figure 8:
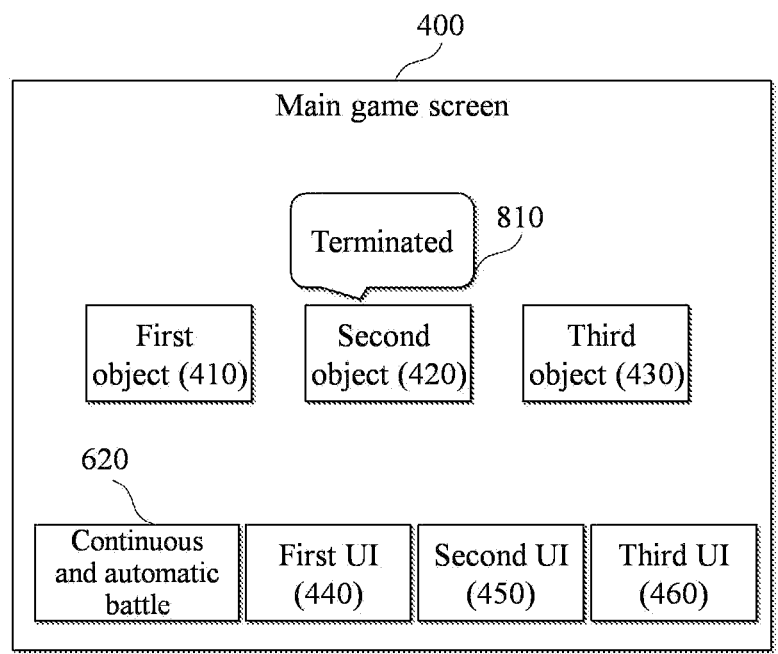
FIG. 8 is a diagram illustrating an example of a user interface in which the termination of a continuous and automatic battle is displayed in an embodiment of the present disclosure.

FIG. 8 is a diagram illustrating an example of a UI in which the termination of a continuous and automatic battle is displayed in an embodiment of the present disclosure. A continuous and automatic battle may be terminated in the state in which the main game screen 400 has been activated. In this case, the computing device 200 may add information 810, indicating that the continuous and automatic battle has been terminated, on the main game screen 400 in association with an object (e.g., the second object 420 in the present embodiment) associated with the continuous and automatic battle. At this time, when a selection input for the object associated with the continuous and automatic battle is recognized, the computing device 200 may change, into the continuous and automatic battle screen 500, the main game screen 400 that is being activated and displayed. In this case, the continuous and automatic battle screen 500 may indicate that the continuous and automatic battle has been terminated.

As described above, according to embodiments of the present disclosure, when a continuous and automatic battle function is activated on a main game screen provided by a main process, a sub-process for executing a continuous and automatic battle is executed. A continuous and automatic battle screen generated by the executed sub-process is provided in parallel to the main game screen provided by the main process. Accordingly, a user can access other pieces of content in game while the continuous and automatic battle is ongoing.

Figure 9:
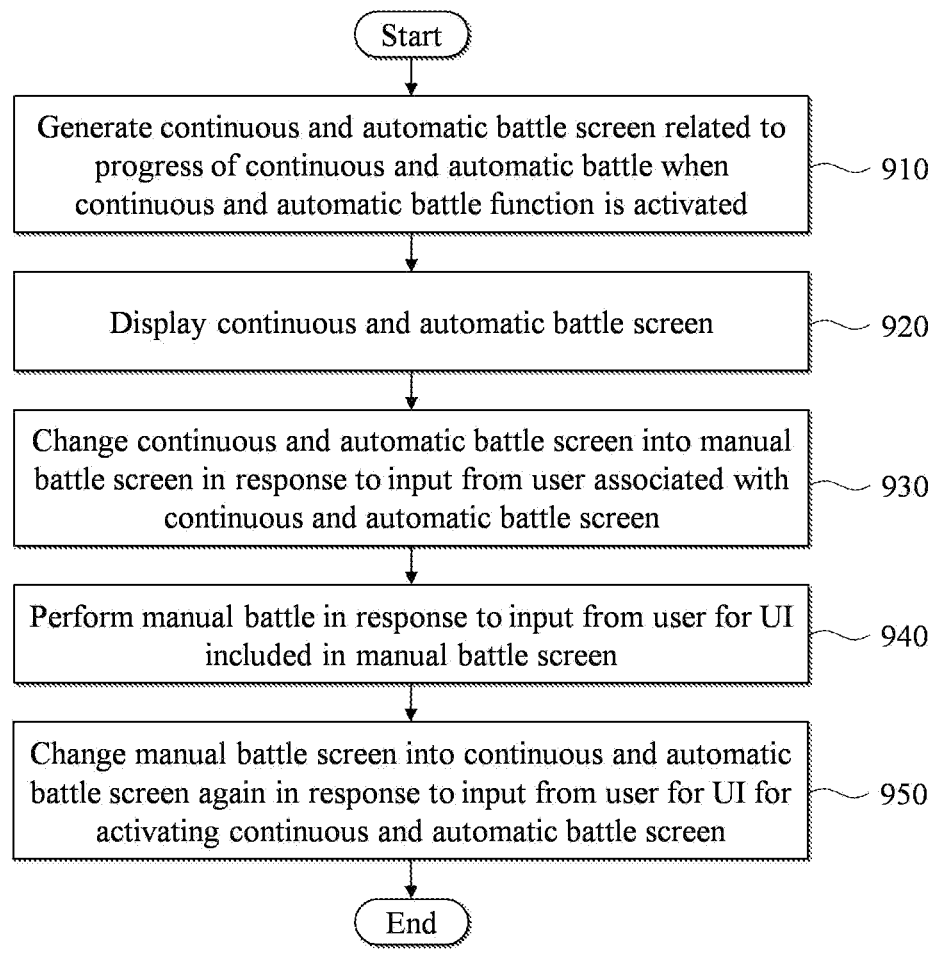
FIG. 9 is a flowchart illustrating another example of a method of providing game according to an embodiment of the present disclosure.

FIG. 9 is a flowchart illustrating another example of a method of providing game according to an embodiment of the present disclosure. The method of providing game according to the present embodiment may be performed by the computing device 200 which implements the system for providing game. In this case, the processor 220 of the computing device 200 may be implemented to execute a control instruction according to a code of an operating system or a code of at least one computer program (e.g., a game application) included in the memory 210. In this case, the processor 220 may control the computing device 200 to perform steps 910 to 950 included in the method of FIG. 9 in response to a control instruction provided by a code stored in the computing device 200.

In step 910, when a continuous and automatic battle function is activated, the computing device 200 may generate a continuous and automatic battle screen related to the progress of a continuous and automatic battle. For example, when the continuous and automatic battle function is activated through a UI provided through a main game screen in the state in which the main game screen has been provided using a main process, the computing device 200 may execute a sub-process for the continuous and automatic battle, and may generate a continuous and automatic battle screen related to the progress of the continuous and automatic battle by using the sub-process.

In step 920, the computing device 200 may display the continuous and automatic battle screen. For example, the computing device 200 may overlap and display the continuous and automatic battle screen on the main game screen in a picture in picture (PIP) form.

In step 930, the computing device 200 may change the continuous and automatic battle screen into a manual battle screen in response to an input from a user, which is associated with the continuous and automatic battle screen. For example, the computing device 200 may change, into the manual battle screen of a full screen, the continuous and automatic battle screen overlapped and displayed on the main game screen. At this time, a manual battle may be performed subsequently to the ongoing continuous and automatic battle. For example, when the continuous and automatic battle function is activated, the computing device 200 may generate a first process for the progress of the continuous and automatic battle, and may perform the continuous and automatic battle by using the first process. At this time, in order for the continuous and automatic battle screen to be changed into the manual battle screen, the computing device 200 may generate a second process for the progress of the manual battle, and may transmit information on the progress of the continuous and automatic battle to the second process for the manual battle so that the contents of the continuous and automatic battle are followed by the manual battle. In this case, the computing device 200 may perform the manual battle subsequently to the contents of the continuous and automatic battle based on the information on the progress of the continuous and automatic battle transmitted to the second process and the second process.

According to another embodiment, a manual battle screen may correspond to a main game screen. As described above, when the continuous and automatic battle function is activated in the main game screen provided by the main process, a user can access other pieces of content in game while a continuous and automatic battle is ongoing by executing a sub-process for the continuous and automatic battle and providing a continuous and automatic battle screen generated by the executed sub-process in parallel to the main game screen provided by a main process. In this case, the other pieces of content may include a common manual battle. In this case, in step 930, the computing device 200 may change the continuous and automatic battle screen for the continuous and automatic battle, performed by a sub-process, into a manual battle screen for a manual battle performed by the main process. In other words, two different battle instances of a first battle instance executed as the continuous and automatic battle and a second battle instance executed as the manual battle may be performed in parallel. The user can check a battle screen of a desired battle instance among the two different battle instances while switching the continuous and automatic battle screen and the manual battle screen.

In step 940, the computing device 200 may perform the manual battle in response to an input from the user for a UI included in the manual battle screen. The manual battle is not an automatic battle, but may be easily understood as a common battle performed in response to a manipulation of a user. In an embodiment, if the contents of a continuous and automatic battle is followed by a manual battle, a user may perform game while changing control of one battle instance automatically and manually. In another embodiment, if a battle instance of a manual battle is performed separately from a battle instance of a continuous and automatic battle, a user may perform the two battle instances at the same time.

In step 950, the computing device 200 may change the manual battle screen into the continuous and automatic battle screen again in response to an input from the user for a UI for activating the continuous and automatic battle screen. The UI for activating the continuous and automatic battle screen may be included in the manual battle screen.

In an embodiment, a manual battle performed by a user may be followed by a continuous and automatic battle. For example, when a manual battle screen is changed into a continuous and automatic battle screen again, the computing device 200 may transmit, to a first process, information on the progress of a manual battle so that the contents of the manual battle performed through a second process are followed by a continuous and automatic battle to be performed through the first process. In this case, the computing device 200 may perform the continuous and automatic battle again that follows the contents of the manual battle based on the first process and the information on the progress of the manual battle transmitted to the first process.

In another embodiment, the battle instance of a continuous and automatic battle and the battle instance of a manual battle may be different battle instances. For example, a user may perform the battle instance of a manual battle through a manual battle screen for the manual battle performed through a main process, may then change the manual battle screen into a continuous and automatic battle screen performed through a sub-process, and may watch the progress of the continuous and automatic battle.

As described above, while performing a continuous and automatic battle, a user may change the continuous and automatic battle into a manual battle and may participate in the ongoing continuous and automatic battle, but may change the manual battle into the continuous and automatic battle through a UI included in a manual battle screen and perform the ongoing continuous and automatic battle again.

Figure 10:
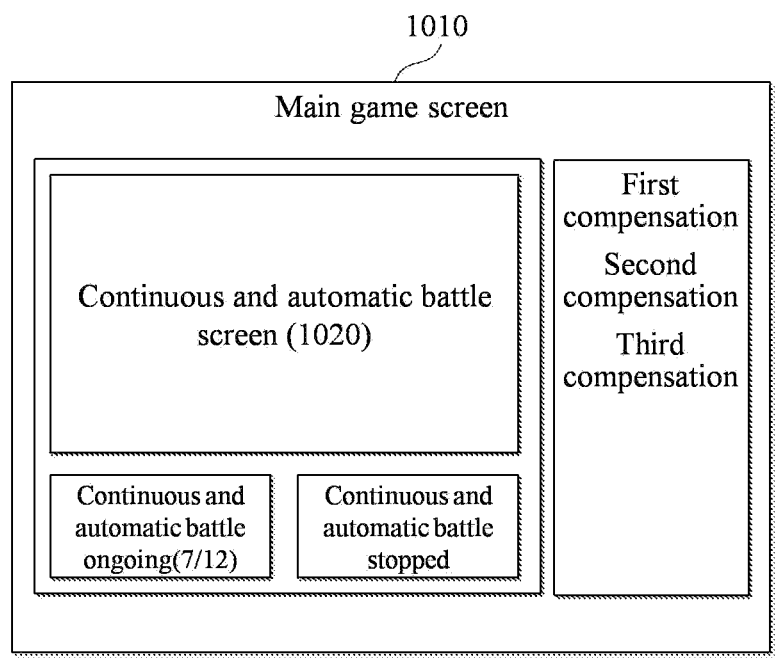
FIGS. 10 and 11 are diagrams illustrating examples in which a continuous and automatic battle screen and a manual battle screen are switched in an embodiment of the present disclosure.
Figure 11:
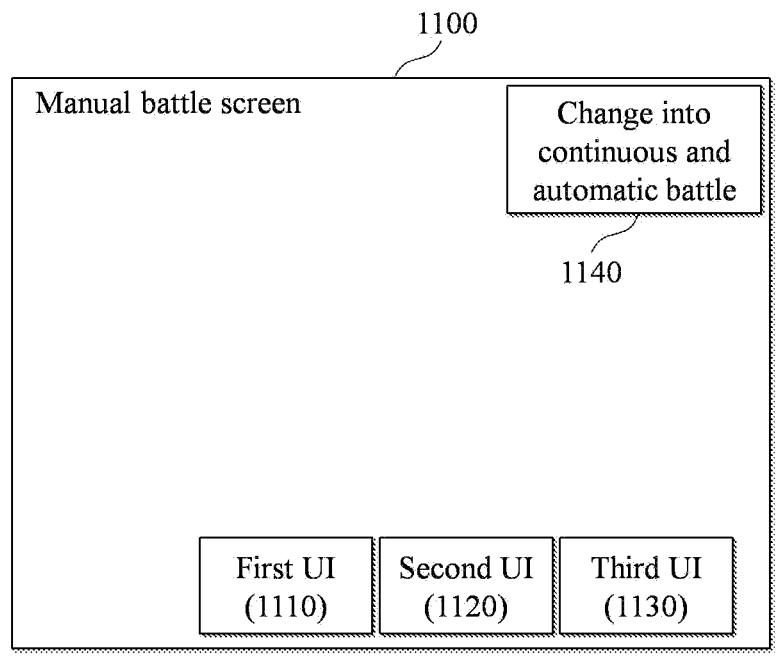

FIGS. 10 and 11 are diagrams illustrating examples in which a continuous and automatic battle screen and a manual battle screen are switched in an embodiment of the present disclosure. Similar to the description given with reference to FIG. 7, FIG. 10 illustrates an example in which a continuous and automatic battle screen 1020 is displayed on a main game screen 1010 in a PIP form.

At this time, when a user selects the continuous and automatic battle screen 1020 (e.g., touches a corresponding region in a touch screen environment or clicks on a corresponding region in a PC environment by using a mouse), as in FIG. 11, a manual battle screen 1100 may be provided. According to embodiments, a separate UI for changing the continuous and automatic battle screen 1020 into the manual battle screen 1100 may be provided in association with the continuous and automatic battle screen 1020.

The manual battle screen 1100 may include UIs (e.g., a first UI 1110, a second UI 1120 and a third UI 1130) for the progress of a manual battle. The manual battle may be performed in response to a manipulation input from a user using the UIs.

Furthermore, the manual battle screen 1100 may include a separate UI 1140 for changing the manual battle screen 1100 into the continuous and automatic battle screen 1020. When a user selects the UI 1140 (e.g., touches a corresponding region in a touch screen environment or clicks on a corresponding region in a PC environment by using a mouse), as in FIG. 10, the manual battle screen 1100 may be changed into the continuous and automatic battle screen 1020 overlapped on the main game screen 1010 in a PIP form.

As already described above, when a continuous and automatic battle screen is changed into a manual battle screen, the contents of a continuous and automatic battle may be followed by a manual battle. Inversely, although the manual battle screen is changed into the continuous and automatic battle screen, the contents of the manual battle may be followed by the continuous and automatic battle. Accordingly, a user can participate in a continuous and automatic battle or perform the continuous and automatic battle again while switching the continuous and automatic battle screen and a manual battle screen easily and simply.

As described above, according to embodiments of the present disclosure, there are provided the method and system for providing game, which enable a user to change a continuous and automatic battle screen into a manual battle screen and to particulate in an ongoing continuous and automatic battle.

The aforementioned device may be implemented by a hardware component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more generalpurpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible. Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or storage media managed in a server. Examples of the program instruction may include machine-language code, such as a code written by a compiler, and a high-level language code executable by a computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as the system, configuration, device, and circuit, are coupled or combined in a form different from that of the described method or replaced or substituted with other components or equivalents.

Accordingly, other implementations, other embodiments, and the equivalents of the claims fall within the scope of the claims.

The embodiments of the invention in which an exclusive property or privilege is claimed are defined as follows:

1. A method of providing, by a computing device comprising at least one processor, game, comprising:
   providing, by the at least one processor, a main game screen by using a main process;
   executing, by the at least one processor, a sub-process for a continuous and automatic battle in response to a continuous and automatic battle function being activated;
   generating, by the at least one processor, a continuous and automatic battle screen related to progress of the continuous and automatic battle by using the sub-process;
   displaying, by the at least one processor, the continuous and automatic battle screen;
   changing, by the at least one processor, the continuous and automatic battle screen of the continuous and automatic battle progressed by the sub-process into a manual battle screen of a manual battle progressed by the main process in response to an input from a user, which is associated with the continuous and automatic battle screen; and
   transmitting, by the at least one processor, information on the progress of the continuous and automatic battle to the main process so that contents of the continuous and automatic battle are followed by the manual battle.

2. The method of claim 1, further comprising performing, by the at least one processor, the manual battle in response to an input from the user for a user interface included in the manual battle screen.

3. The method of claim 1, wherein:
   the manual battle screen comprises a user interface for activating the continuous and automatic battle screen, and
   the method further comprises changing, by the at least one processor, the manual battle screen into the continuous and automatic battle screen again in response to an input from the user for a user interface for activating the continuous and automatic battle screen.

4. The method of claim 3, further comprising transmitting, by the at least one processor, information on progress of the manual battle to the sub-process so that contents of the manual battle are followed by the continuous and automatic battle in response to the manual battle screen being changed into the continuous and automatic battle screen again.

5. The method of claim 1, further comprising changing, by the at least one processor, the manual battle screen into the continuous and automatic battle screen again in response to the manual battle being terminated through the manual battle screen.

6. The method of claim 1, wherein displaying the continuous and automatic battle screen comprises overlapping and displaying the continuous and automatic battle screen on a main game screen in a picture in picture (PIP) form.

7. The method of claim 6, wherein changing the continuous and automatic battle screen into the manual battle screen comprises changing, into the manual battle screen of a full screen, the continuous and automatic battle screen overlapped and displayed on the main game screen.

8. A computer-readable recording medium on which a computer program for executing the method according to claim 1 in a computing device has been recorded.

9. A computing device comprising:

at least one processor implemented to execute an instruction readable by a computing device, wherein the at least one processor is implemented to:

provide a main game screen by using a main process, execute a sub-process for a continuous and automatic battle in response to a continuous and automatic battle function being activated, generate a continuous and automatic battle screen related to progress of the continuous and automatic battle by using the sub-process, display the continuous and automatic battle screen, and change the continuous and automatic battle screen of the continuous and automatic battle progressed by the sub-process into a manual battle screen of a manual battle progressed by the main process in response to an input from a user, which is associated with the continuous and automatic battle screen; and transmit information on the progress of the continuous and automatic battle to the main process so that contents of the continuous and automatic battle are followed by the manual battle.

10. The computing device of claim 9, wherein the at least one processor performs the manual battle in response to an input from the user for a user interface included in the manual battle screen.

11. The computing device of claim 9, wherein:

the manual battle screen comprises a user interface for activating the continuous and automatic battle screen, and the at least one processor changes the manual battle screen into the continuous and automatic battle screen again in response to an input from the user for a user interface for activating the continuous and automatic battle screen.

12. The computing device of claim 11, wherein in response to the manual battle screen being changed into the continuous and automatic battle screen again, the at least one processor transmits information on progress of the manual battle to the sub-process so that contents of the manual battle are followed by the continuous and automatic battle.

13. The computing device of claim 9, wherein the at least one processor changes the manual battle screen into the continuous and automatic battle screen again in response to the manual battle being terminated through the manual battle screen.

* * * * *